US008815471B2

(12) United States Patent
Maeda et al.

(10) Patent No.: US 8,815,471 B2
(45) Date of Patent: Aug. 26, 2014

(54) METHOD OF MANUFACTURING FUEL CELL SEPARATOR, FUEL CELL SEPARATOR AND FUEL CELL, INCLUDING GOLD PLATING

(75) Inventors: Kuroudo Maeda, Miyoshi (JP); Makoto Yoshida, Toyota (JP); Masahiro Mizuno, Kariya (JP); Shinji Dewaki, Toki (JP)

(73) Assignees: Toyota Jidosha Kabushiki Kaisha, Toyota-shi, Aichi-ken (JP); Aisin Takaoka Co., Ltd., Toyota-shi, Aichi-ken (JP); Nippon Chemical Denshi, Inc., Owariasahi-shi, Aichi-ken (JP)

( * ) Notice: Subject to any disclaimer, the term of this patent is extended or adjusted under 35 U.S.C. 154(b) by 639 days.

(21) Appl. No.: 12/746,202

(22) PCT Filed: Dec. 4, 2008

(86) PCT No.: PCT/JP2008/072463
§ 371 (c)(1),
(2), (4) Date: Aug. 20, 2010

(87) PCT Pub. No.: WO2009/072665
PCT Pub. Date: Jun. 11, 2009

(65) Prior Publication Data
US 2010/0310969 A1  Dec. 9, 2010

(30) Foreign Application Priority Data
Dec. 7, 2007  (JP) ................................ 2007-316737

(51) Int. Cl.
*H01M 8/00* (2006.01)
*H01M 8/04* (2006.01)

(52) U.S. Cl.
USPC ........................... 429/535; 429/514; 427/115

(58) Field of Classification Search
USPC ................. 429/514, 518, 519, 522, 517, 535; 427/115; 205/266
See application file for complete search history.

(56) References Cited

U.S. PATENT DOCUMENTS

| 6,203,936 B1 | 3/2001 | Cisar et al. |
| 2004/0197661 A1 | 10/2004 | Utsunomiya et al. |
| 2005/0100771 A1* | 5/2005 | Vyas et al. ..................... 429/32 |

FOREIGN PATENT DOCUMENTS

| JP | 61-243193 | 10/1986 |
| JP | 3-193895 | 8/1991 |

(Continued)

OTHER PUBLICATIONS

International Search Report in International Application No. PCT/JP2008/072463, Mailing Date: Mar. 11, 2009.
International Preliminary Report on Patentability in International Application No. PCT/JP2008/072463 (Mar. 4, 2010).
Written Opinion of the International Search Authority in International Application No. PCT/JP2008/072463, Mailing Date: Mar. 11, 2009.

(Continued)

*Primary Examiner* — Raymond Alejandro
(74) *Attorney, Agent, or Firm* — Finnegan, Henderson, Farabow, Garrett & Dunner, LLP

(57) ABSTRACT

A method of manufacturing a fuel cell separator is provided such that the corrosion resistance can be improved. A method of manufacturing a fuel cell separator that separates adjacent cells of a fuel cell includes subjecting a separator substrate composed of a metal material to gold strike plating, thereby forming a first gold plating layer with a thickness of 10 to 200 nm. Further, thick gold plating is performed on top of the first gold plating layer formed by gold strike plating, thereby forming a second gold plating layer. A fuel cell separator manufactured by the method and a fuel cell including the fuel cell separator are also provided.

4 Claims, 7 Drawing Sheets

(56) References Cited

FOREIGN PATENT DOCUMENTS

| | | | | |
|---|---|---|---|---|
| JP | 2003-338296 | | 11/2003 | |
| JP | 2004-71321 | | 3/2004 | |
| JP | 2004-296381 | | 10/2004 | |
| JP | 2005-302669 | | 10/2005 | |
| JP | 2006-236740 | * | 9/2006 | ............. H01M 8/02 |
| WO | WO 98/40537 | | 9/1998 | |

OTHER PUBLICATIONS

Reply to Written Opinion in International Application No. PCT/JP2008/072463 (Responsive to Opinion mailed Mar. 11, 2009).

Notice of Grounds for Rejection for JP Appl. No. 2007-316737 dated Apr. 17, 2012.

Decision of Rejection for JP Appl. No. 2007-316737 dated Jul. 3, 2012.

* cited by examiner

FIXED POTENTIAL TEST DIAGRAM

RELATIONSHIP BETWEEN STRIKE PLATING THICKNESS
AND CORROSION ONSET TIME

NO RUST GENERATION (FOLLOWING CORROSION TEST)

METHOD OF MANUFACTURING FUEL CELL SEPARATOR, FUEL CELL SEPARATOR AND FUEL CELL, INCLUDING GOLD PLATING

TECHNICAL FIELD

The present invention relates to a method of manufacturing a fuel cell separator, a fuel cell separator and a fuel cell, and relates more particularly to a method of manufacturing a fuel cell separator that separates adjacent cells of a fuel cell, a fuel cell separator and a fuel cell.

BACKGROUND ART

Fuel cells have recently been highlighted as cells that exhibit a high level of efficiency and excellent environmental characteristics. In a fuel cell, generally, the oxygen within air, which functions as an oxidant gas, is subjected to an electrochemical reaction with hydrogen, which functions as a fuel gas, thereby generating electrical energy. As a result of the electrochemical reaction between the hydrogen and oxygen, water is generated.

Varieties of fuel cell include phosphoric acid fuel cells, molten carbonate fuel cells, solid electrolyte fuel cells, alkali fuel cells and solid polymer fuel cells. Of these, solid polymer fuel cells, which offer certain advantages such as ambient temperature startup and a rapid startup time, are attracting particular attention. This type of solid polymer fuel cell can be used as the power source for moving objects such as vehicles.

A solid polymer fuel cell is assembled by laminating a plurality of unit cells, a current collector and an end plate and the like. Each cell for the fuel cell comprises an electrolyte membrane, a catalyst layer, a gas diffusion layer and a separator.

Patent Document 1 discloses a method of using gold plating to impart stainless steel with excellent soldering properties and wire bonding properties at low cost, wherein as a pretreatment, the surface of the stainless steel is highly activated by subjecting the stainless steel to cathodic electrolysis in two separate stages in electrolysis baths comprising an inorganic acid and an organic acid, so that when gold plating is performed, pinholes and the like do not occur, and the plating adhesion improves markedly.

Patent Document 2 discloses a metal separator for a fuel cell in which a portion of the stainless steel is plated with the premise of avoiding significant increases in the manufacturing cost, wherein the separator yields excellent contact resistance with the gas diffusion electrode and has excellent corrosion resistance that enables the lifespan required of a separator to be achieved, and wherein a conductive inclusion is exposed through the surface having corrosion resistance, and the region of the surface where the conductive inclusion is not exposed is coated with gold.

Patent Document 1: JP 61-243193 A
Patent Document 2: JP 2004-71321 A

DISCLOSURE OF INVENTION

Problems to be Solved by the Invention

However, in those cases where a fuel cell separator is manufactured from a metal material such as titanium, generally a conductor with a high electrical conductivity such as the gold mentioned above is used to coat the separator surface, thereby reducing the contact resistance with the gas diffusion layer and the like. If the coating film of the conductor is not formed in a dense manner, then the separator may be corroded by the fluorine (F) or chlorine (Cl) or the like generated from the fuel cell power generation environment.

The present invention provides a method of manufacturing a fuel cell separator with particularly improved corrosion resistance, a fuel cell separator, and a fuel cell comprising the fuel cell separator.

Means to Solve the Problems

The present invention provides a method of manufacturing a fuel cell separator that separates adjacent cells of a fuel cell, the method comprising subjecting a separator substrate composed of a metal material to gold strike plating, thereby forming a first gold plating layer having a thickness of approximately 10 nm to approximately 200 nm.

Furthermore, in the above method of manufacturing a fuel cell separator, an additional gold plating is preferably performed on top of the first gold plating layer formed by the gold strike plating, thereby forming a second gold plating layer.

Furthermore, in the above method of manufacturing a fuel cell separator, the first gold plating layer is preferably formed with a thickness of not less than approximately 70 nm and not more than approximately 120 nm.

Moreover, in the above method of manufacturing a fuel cell separator, the first gold plating layer is preferably formed with a thickness of not less than approximately 70 nm and not more than approximately 100 nm.

Furthermore, in the above method of manufacturing a fuel cell separator, the separator substrate is preferably molded from titanium or stainless steel.

Furthermore, the present invention also provides a fuel cell separator manufactured using the above method of manufacturing a fuel cell separator.

Moreover, the present invention also provides a fuel cell comprising a fuel cell separator manufactured using the above method of manufacturing a fuel cell separator.

Effect of the Invention

As described above, in a method of manufacturing a fuel cell separator according to the present invention, and in a fuel cell separator and a fuel cell according to the present invention, because gold can be formed more densely on the surface of the fuel cell separator, the corrosion resistance can be further improved.

DESCRIPTION OF THE REFERENCE SYMBOLS

Figure 1:
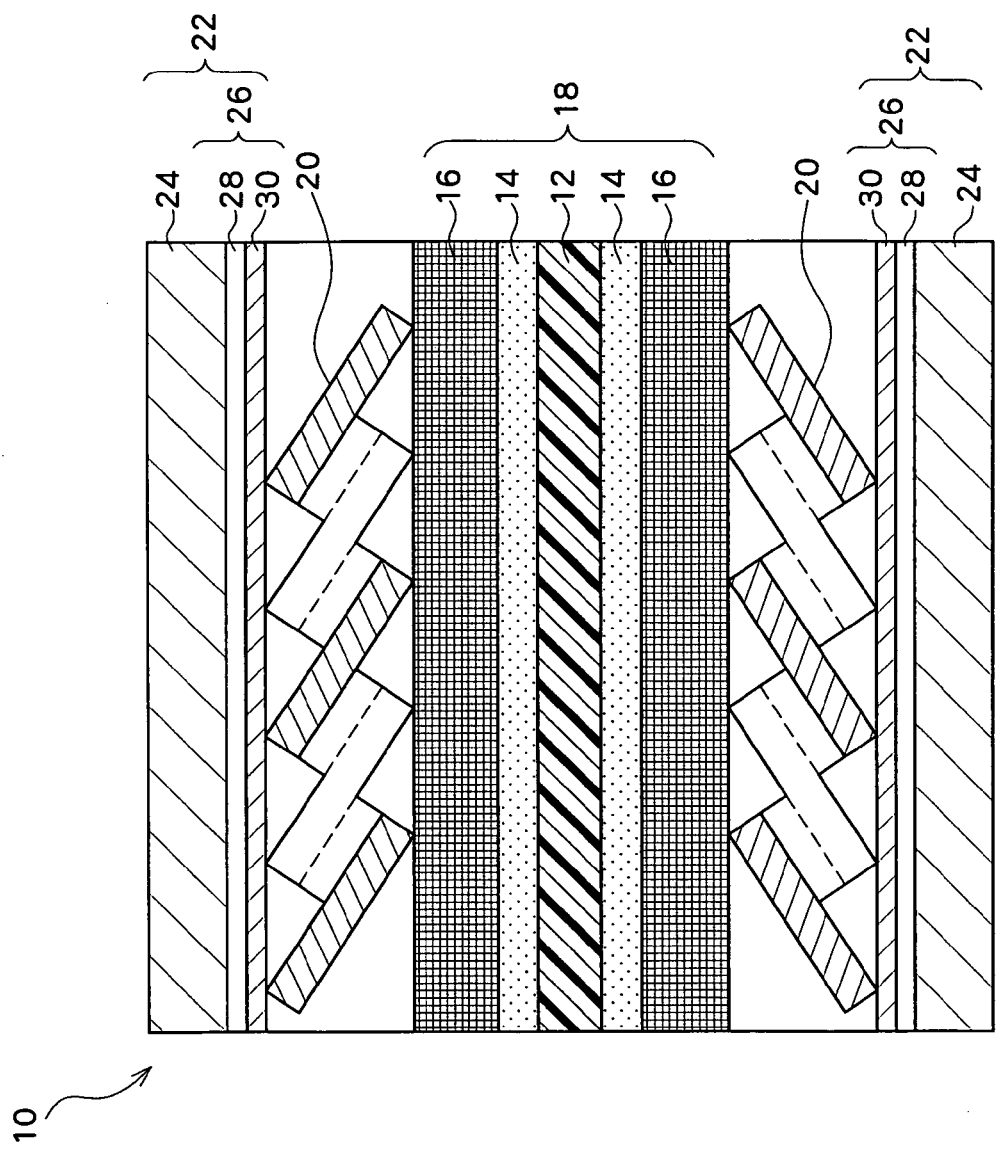
FIG. 1 is a diagram showing a cross-section of a cell for a fuel cell according to an embodiment of the present invention.

10 Cell for fuel cell
12 Electrolyte membrane
14 Catalyst layer
16 Gas diffusion layer
18 Membrane electrode assembly
20 Expanded molding
22 Separator
24 Separator substrate
26 Conductive layer
28 First gold plating layer
30 Second gold plating layer

BEST MODE FOR CARRYING OUT THE INVENTION

A detailed description of embodiments according to the present invention is provided below with reference to the drawings. First is a description of the structure of a cell for a fuel cell. FIG. 1 is a diagram showing a cross-section of a cell 10 for a fuel cell. The cell 10 for a fuel cell comprises a membrane electrode assembly (MEA) 18, which integrates an electrolyte membrane 12, a catalyst layer 14 and a gas diffusion layer 16, and forms an electrode of the fuel cell, as well as an expanded molding 20, which is a gas passage structure that forms gas passages, and a separator 22 that separates the fuel gas or oxidant gas from an adjacent cell (not shown in the drawing). The cell 10 for a fuel cell shown in FIG. 1 is merely one example, and the cell structure is not limited to this structure.

The electrolyte membrane 12 has a function of transporting hydrogen ions generated at the anode electrode side to the cathode electrode side. A chemically stable fluororesin such as a perfluorocarbonsulfonic acid ion exchange membrane or the like may be used as the material for the electrolyte membrane 12.

The catalyst layer 14 has a function of accelerating the oxidation reaction of hydrogen at the anode electrode side, and the reduction reaction of oxygen at the cathode electrode side. The catalyst layer 14 comprises a catalyst and a catalyst support. In order to maximize the electrode surface area available for reaction, the catalyst is generally in a particulate form that is adhered to the catalyst support. For the oxidation reaction of hydrogen and the reduction reaction of oxygen, a platinum group element having a small activation overpotential such as platinum or the like may be used as the catalyst. A carbon material such as carbon black or the like may be used as the catalyst support.

The gas diffusion layer 16 has a function of diffusing the fuel gas such as hydrogen gas and the oxidant gas such as air through to the catalyst layer 14, and a function of transporting electrons. A material that exhibits conductivity, such as a carbon fiber woven fabric or a carbon paper or the like, may be used for the gas diffusion layer 16.

The expanded molding 20 is laminated onto both surfaces of the membrane electrode assembly 18, and functions as a gas passage structure that forms gas passages. The expanded molding 20 is laminated so as to contact the gas diffusion layer 16 of the membrane electrode assembly 18 and the separator 22, and is connected electrically to the membrane electrode assembly 18 and the separator 22. The expanded molding 20 has a mesh structure comprising a multitude of openings, and therefore a larger quantity of the fuel gas or the like can contact the membrane electrode assembly 18 and undergo chemical reaction, meaning the power generation efficiency of the cell 10 for a fuel cell can be increased.

For the expanded molding 20, expanded metals prescribed in JIS G 3351, or metal laths or metal porous materials prescribed in JIS A 5505 or the like may be used. Furthermore, the expanded molding 20 is preferably molded from titanium, a titanium alloy or stainless steel or the like. The reason for this preference is that these metal materials have a high mechanical strength, and include an inactive coating such as a passivation film comprising a stable oxide (such as $TiO$, $Ti_2O_3$, $TiO_2$, $CrO_2$, $CrO$ or $Cr_2O_3$) on the metal surface, and therefore exhibit excellent corrosion resistance. For the stainless steel, austenite stainless steel or ferrite stainless steel or the like may be used.

The separator 22 is laminated to the expanded molding 20, and has the function of separating the fuel gas and oxidant gas in adjacent cells (not shown in the drawings). Furthermore, the separator 22 also has the function of electrically connecting adjacent cells (not shown in the drawings). The separator 22 comprises a separator substrate 24, and a conductive layer 26 formed on the separator substrate 24.

The separator substrate 24 is preferably molded from titanium, a titanium alloy or stainless steel or the like. As described above, the reason for this preference is that titanium materials and stainless steel have a high mechanical strength, and include an inactive coating such as a passivation film comprising a stable oxide formed on the metal surface, and therefore exhibit excellent corrosion resistance.

The conductive layer 26 has a function of reducing the contact resistance between the expanded molding 20 and the separator substrate 24. The conductive layer 26 is formed using gold (Au) as a conductor. Gold (Au) has excellent corrosion resistance, and has a high electrical conductivity.

The conductive layer 26 comprises a first gold plating layer 28 and a second gold plating layer 30. As described below, the first gold plating layer 28 is formed on the surface of the separator substrate 24 using a gold strike plating method, whereas the second gold plating layer 30 is formed on top of the first gold plating layer 28 using a thick gold plating method or the like. Forming the first gold plating layer 28 by gold strike plating enables a more dense coating film to be formed. Furthermore, forming the layer using gold strike plating also enables the adhesion between the separator substrate 24 and the first gold plating layer 28 to be improved.

Next is a description of a method of manufacturing the fuel cell separator 22.

Figure 2:
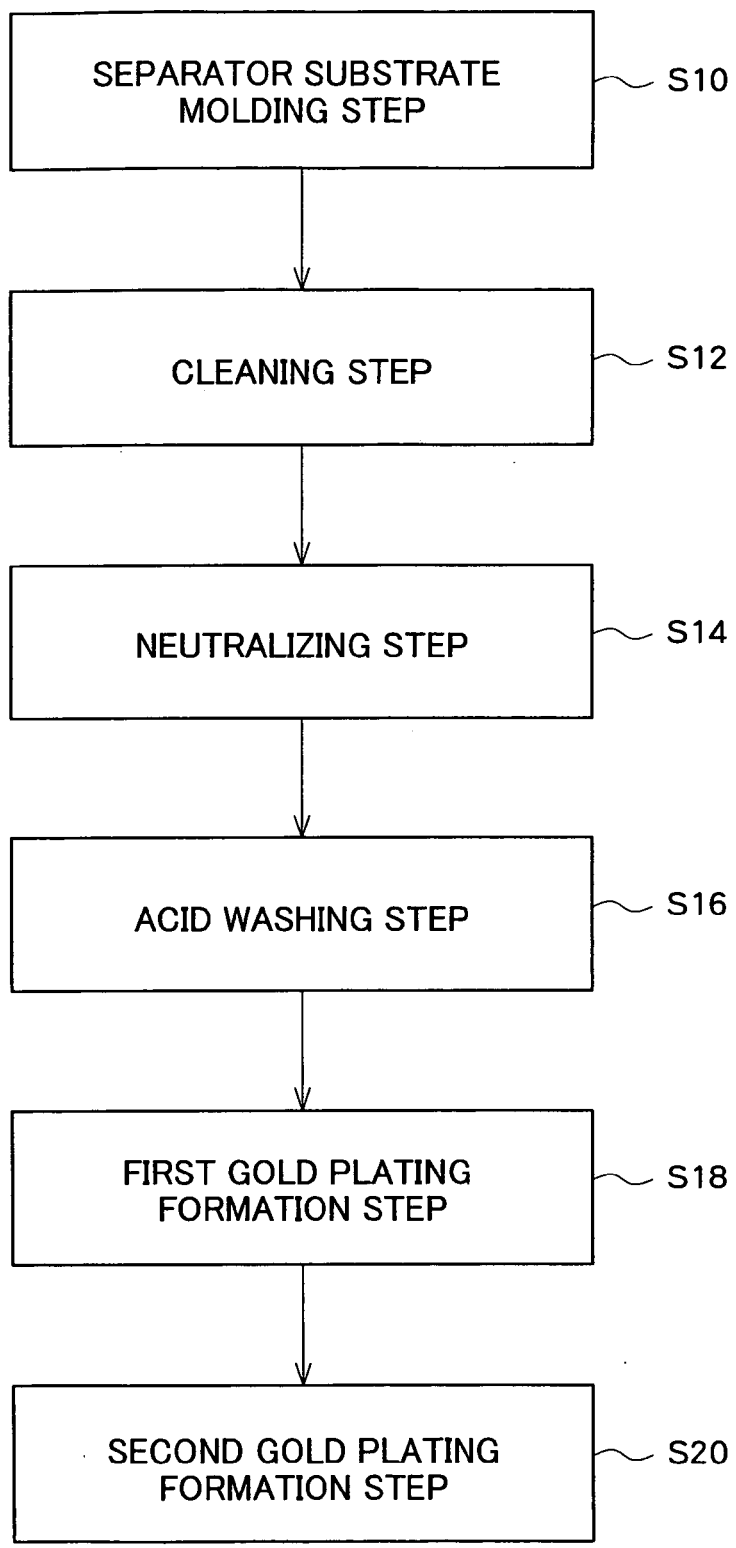
FIG. 2 is a flowchart showing a method of manufacturing a separator according to an embodiment of the present invention.

FIG. 2 is a flowchart showing a method of manufacturing the separator 22. The method of manufacturing the separator 22 comprises a separator substrate molding step (S10), a cleaning step (S12), a neutralizing step (S14), an acid washing step (S16), a first gold plating layer formation step (S18), and a second gold plating layer formation step (S20). A fuel cell separator having only the first gold plating layer 28 formed on the separator substrate 24 may also be manufactured by omitting the second gold plating layer formation step (S20) shown in the flowchart of FIG. 2, and sequentially executing the separator substrate molding step (S10), the cleaning step (S12), the neutralizing step (S14), the acid washing step (S16), and the first gold plating layer formation step (S18).

The separator substrate molding step (S10) is a step of molding the separator substrate 24 from a metal material. As mentioned above, titanium or stainless steel or the like may be used as the metal material. The separator substrate 24 is molded, for example, into a sheet-like form or the like by subjecting the titanium or stainless steel to rolling or press working or the like.

The cleaning step (S12) is a step of cleaning the separator substrate 24. For example, the separator substrate 24 may be cleaned by alkali dipping degreasing or the like. An alkaline solution or the like of caustic soda or the like may be used for the alkali dipping degreasing. By cleaning the separator substrate 24 by alkali dipping degreasing or the like, oil components and the like adhered to the surface of the separator substrate 24 may be removed.

The neutralizing step (S14) is a step of neutralizing and then removing the residual alkaline solution left on the separator substrate 24 following cleaning. The neutralizing treatment may be conducted, for example, by dipping the cleaned separator substrate 24 in a neutralizing solution. A sulfuric acid solution, hydrochloric acid solution or nitric acid solution or the like may be used as the neutralizing solution. Following removal from the neutralizing solution, the separator substrate 24 may be washed with deionized water or the like.

The acid washing step (S16) is a step of acid washing the separator substrate 24 that has undergone the neutralizing treatment and the like, thereby removing oxides and the like formed on the surface of the separator substrate 24. The acid washing treatment may be conducted, for example, by dipping the separator substrate 24 in a nitric hydrofluoric acid solution or a hydrofluoric acid solution or the like. Following removal from the nitric hydrofluoric acid solution or the like, the separator substrate 24 may be washed with deionized water or the like.

The first gold plating layer formation step (S18) is a step of forming the first goldplating layer 28 on the separator substrate 24 that has undergone the acid washing treatment and the like. The first gold plating layer 28 is formed using a gold strike plating method. The reason for using a gold strike plating method is to enable the first gold plating layer 28 to be formed more densely. Conventionally conducted gold electrolytic plating methods or the like can be used for the gold strike plating method. A plating bath comprising gold potassium cyanide or gold sodium sulfite or the like may be used as the gold strike plating bath. Furthermore, an alkaline bath or an acidic bath or the like may be used for the gold strike plating bath. In a gold strike plating method, the metal ion concentration is set lower than that used in a typical thick gold plating method, and plating is conducted at a comparatively high current density. In this case, the current density can be set, for example, within a range from approximately 0.2 to approximately 2 A/dm$^2$.

Figure 3A:
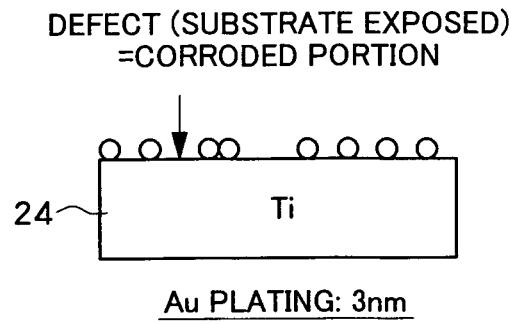
FIGS. 3A-3C are schematic illustrations showing the formation of a first gold plating layer of predetermined thickness on a separator substrate according to an embodiment of the present invention.
Figure 3B:
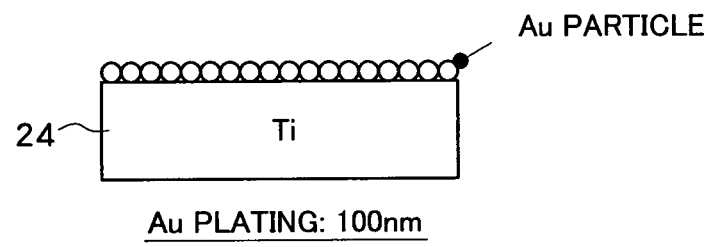
Figure 3C:
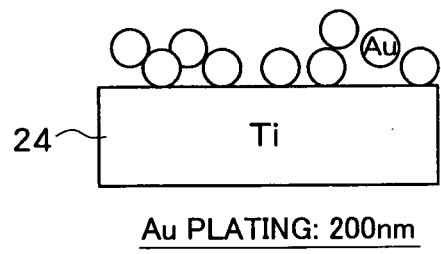

FIGS. 3A-3C are schematic illustrations showing the formation of the first gold plating layer 28 at predetermined thickness levels on the separator substrate 24, wherein FIG. 3A is a schematic illustration showing the formation of the first gold plating layer 28 at a thickness of approximately 3 nm, FIG. 3B is a schematic illustration showing the formation of the first gold plating layer 28 at a thickness of approximately 100 nm, and FIG. 3C is a schematic illustration showing the formation of the first gold plating layer 28 at a thickness exceeding approximately 200 nm.

The first gold plating layer 28 is typically formed with a thickness of not less than approximately 10 nm and not more than approximately 200 nm. The reason for having the thickness of the first gold plating layer 28 not less than approximately 10 nm is that if the first gold plating layer 28 is formed with a thickness of less than approximately 10 nm using gold strike plating, then the gold plating layer tends to have increased numbers of irregularities and defects, and the gold plating layer cannot be formed in a dense manner. The reason for having the thickness of the first gold plating layer 28 not more than approximately 200 nm is that if the first gold plating layer 28 is formed with a thickness of more than approximately 200 nm using gold strike plating, then the deposited gold particles may become coarser, and the denseness of the gold plating layer may deteriorate. The first gold plating layer 28 is preferably formed with a thickness of not less than approximately 70 nm and not more than approximately 120 nm, and even more preferably formed with a thickness of not less than approximately 70 nm and not more than approximately 100 nm. This is because forming the first gold plating layer 28 with a thickness of not less than approximately 70 nm and not more than approximately 100 nm can yield a further improvement in the corrosion resistance of the separator 22.

The second gold plating layer formation step (S20) is a step of forming the second gold plating layer 30 on the separator substrate 24 having the first gold plating layer 28 formed thereon. The second gold plating layer 30 may be formed, for example, using a thick gold plating method or the like. A conventionally conducted electrolytic plating method or the like can be used for the thick gold plating method. A plating bath comprising gold potassium cyanide or gold sodium sulfite or the like may be used as the gold plating bath. Furthermore, an alkaline bath, a neutral bath or an acidic bath or the like may be used for the gold plating bath. The second gold plating layer 30 is formed on the first gold plating layer 28, for example, with a thickness within a range from approximately 100 nm to approximately 20 μm.

According to the configuration described above, by forming the first gold plating layer on the separator substrate 24 using a gold strike plating method, the first gold plating layer can be formed more densely, enabling the corrosion resistance of the first gold plating layer to be enhanced, and as a result, the corrosion resistance of the fuel cell separator can also be improved. Furthermore, by forming the second gold plating layer on the dense first gold plating layer, the corrosion resistance of the conductive layer comprising the first gold plating layer and the second gold plating layer can be further enhanced, meaning the corrosion resistance of the fuel cell separator can be further improved.

EXAMPLES

A more detailed description of specifics of the present invention is provided below based on examples and comparative examples, although the present invention is in no way limited by the examples presented below.

The thickness of the gold strike layer of the first gold plating layer 28 is varied, and the corrosion resistance is evaluated. The corrosion resistance evaluation is conducted by forming only the gold strike plating layer on a titanium sheet that acts as the separator substrate 24. The titanium sheet is first subjected to alkali degreasing washing, and is then subjected to a neutralizing treatment with sulfuric acid and an acid washing treatment with a nitric hydrofluoric acid solution. Subsequently, the acid-washed titanium sheet is subjected to gold strike plating. For the gold strike plating, an alkaline non-cyanide gold plating bath is used. Then, with the current density set to 1 A/dm$^2$, a gold strike plating layer is formed with the plating time adjusted so as to form a gold strike plating layer with a thickness from 3 nm to 200 nm (3 nm, 5 nm, 10 nm, 20 nm, 30 nm, 40 nm, 50 nm, 60 nm, 70 nm, 80 nm, 100 nm, 120 nm, 140 nm, 160 nm, 180 nm or 200 nm).

Figure 4:
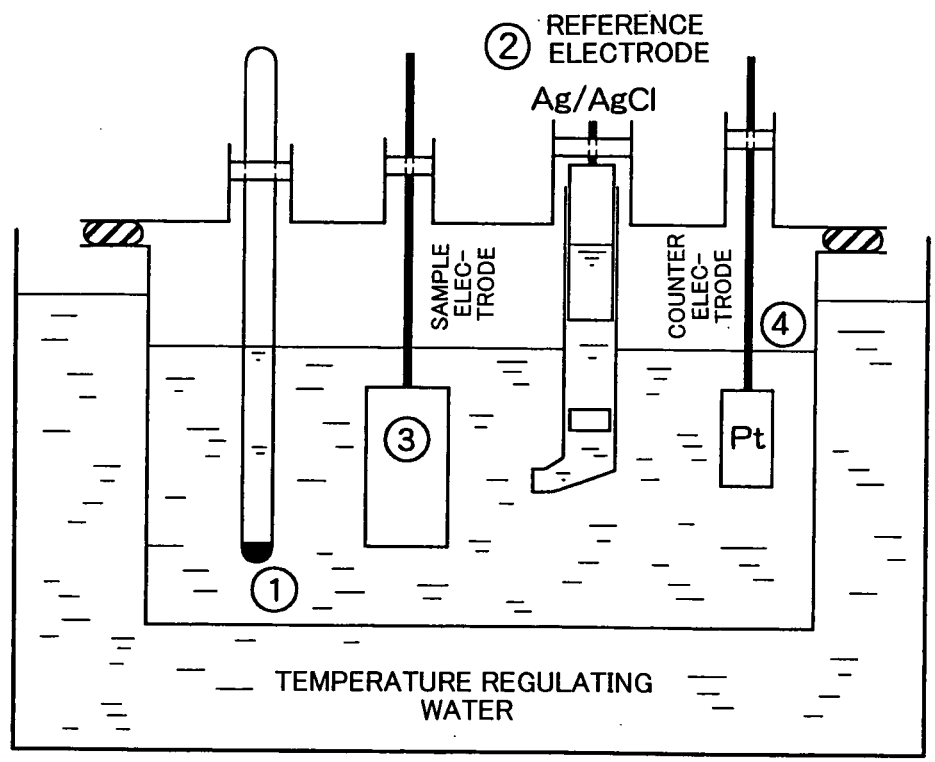
FIG. 4 is a diagram showing a test apparatus used in conducting an electrochemical high-temperature corrosion test in an embodiment of the present invention.

The corrosion test is conducted in accordance with the electrochemical high-temperature corrosion test method for metal materials prescribed in JIS Z2294. FIG. 4 is a diagram showing the test apparatus used in conducting the electrochemical high-temperature corrosion test. The test is conducted in a system open to the atmosphere. The solution used in the test is a sulfuric acid-based solution. The temperature of the test solution is set to 50° C. The corrosion test is conducted over 50 hours, while a fixed potential is applied. Evaluation of the corrosion resistance is performed by determining the corrosion onset time based on observation of the external appearance and the corrosion generating current.

Figure 5:
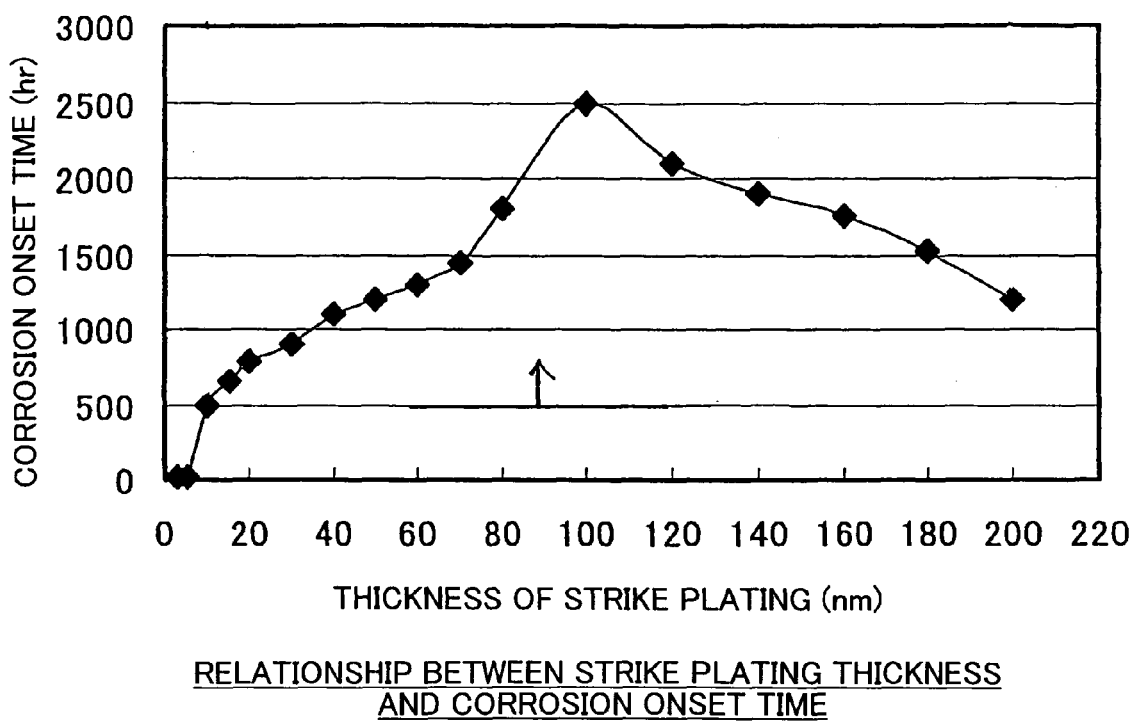
FIG. 5 is a diagram showing the results of a corrosion evaluation test in an embodiment of the present invention.

FIG. 5 is a diagram showing the results of the corrosion evaluation test. As shown in FIG. 5, the thickness of the gold strike plating layer is plotted along the horizontal axis, and the corrosion onset time is plotted along the vertical axis, while the data for the corrosion onset time for each of the gold strike plating layers of varying thickness are shown as black diamonds. When the thickness of the gold strike plating layer is less than 10 nm, the corrosion onset time is shorter than 500 hours, and satisfactory corrosion resistance is unattainable. As the thickness of the gold strike plating layer is increased from 10 nm to 70 nm, the corrosion onset time gradually lengthens, as the thickness of the gold strike plating layer is increased from 70 nm to 100 nm, the corrosion onset time lengthens rapidly, and then as the thickness of the gold strike plating layer is increased from 100 nm to 200 nm, the corrosion onset time gradually shortens. In this manner, when the thickness of the gold strike plating layer is within a range from 10 nm to 200 nm, the corrosion onset time is longer than 500 hours, indicating that favorable corrosion resistance can be obtained.

Next, in order to evaluate how the corrosion resistance of the separator varies depending on the presence or absence of the gold strike plating layer, two types of separator test pieces are prepared and then subjected to corrosion evaluation tests. First is a description of a method of manufacturing a separator test piece according to an example 1. In the method of manufacturing a separator test piece of the example 1, a titanium sheet molded from titanium is first subjected to alkali degreasing washing, and is then subjected to a neutralizing treatment with sulfuric acid and an acid washing treatment with a nitric hydrofluoric acid solution. Subsequently, the acid-washed titanium sheet is subjected to gold strike plating using an alkaline non-cyanide gold plating bath. The thickness of the gold strike plating layer is set to 100 nm. Thick gold plating is then conducted onto the gold strike plating layer using an alkaline non-cyanide gold plating bath. The thickness of this gold plating layer is set to 20 μm.

Next is a description of a method of manufacturing a separator test piece according to a comparative example 1. In the method of manufacturing a separator test piece of the comparative example 1, a titanium sheet molded from titanium is first subjected to alkali degreasing washing, and is then subjected to a neutralizing treatment and an acid washing treatment in the same manner as that described for the separator test piece of the example 1. Subsequently, a thick gold plating layer of thickness 20 μm is formed directly on the acid-washed titanium sheet, without first forming a gold strike plating layer. The thick gold plating is conducted using the same method as that described for the example 1.

Figure 6:
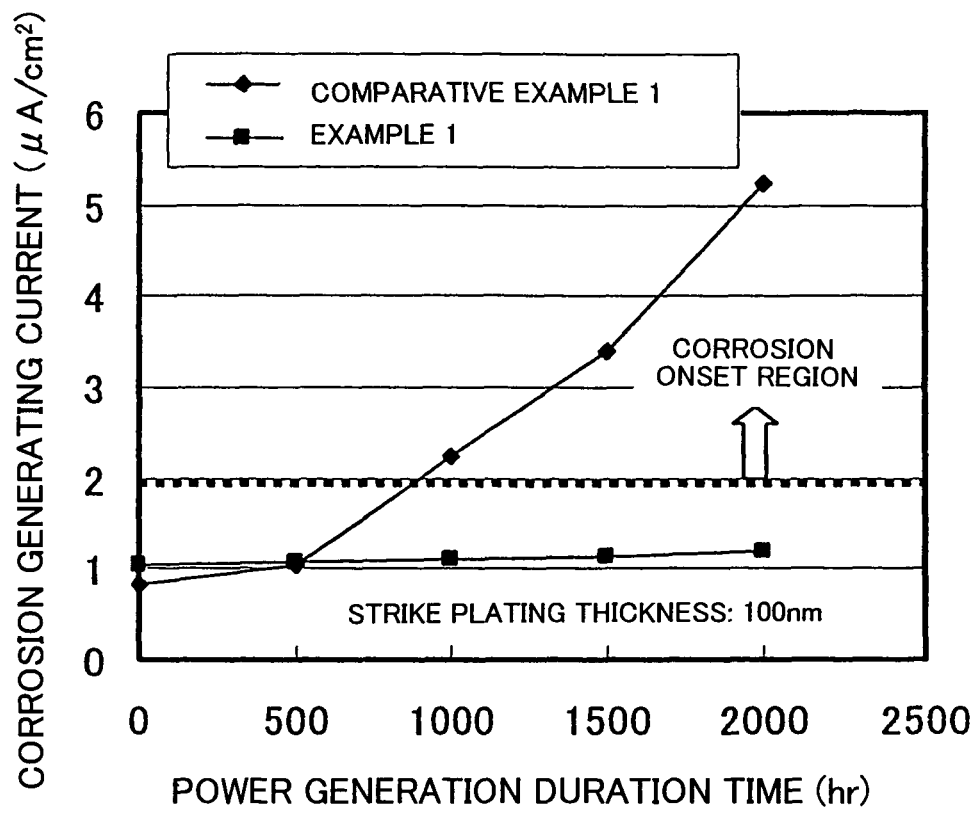
FIG. 6 is a diagram showing the results of a corrosion resistance evaluation test in an embodiment of the present invention.

Corrosion resistance evaluation tests are performed for the separator test pieces of the example 1 and the comparative example 1. The corrosion resistance evaluation tests are conducted in accordance with JIS Z2294 described above. FIG. 6 a diagram showing the results of the corrosion resistance evaluation tests. As shown in FIG. 6, the power generation duration time is plotted along the horizontal axis, the corrosion generating current is plotted along the vertical axis, the data for the separator test piece of the example 1 are shown as black squares, and the data for the separator test piece of the comparative example 1 are shown as black diamonds. With the separator test piece of the comparative example 1, the corrosion generating current value starts to increase 500 hours after test commencement, indicating that corrosion is proceeding. In contrast, with the separator test piece of the example 1, almost no increase in the corrosion generating current is observed, even 2,000 hours after test commencement.

Figure 7:
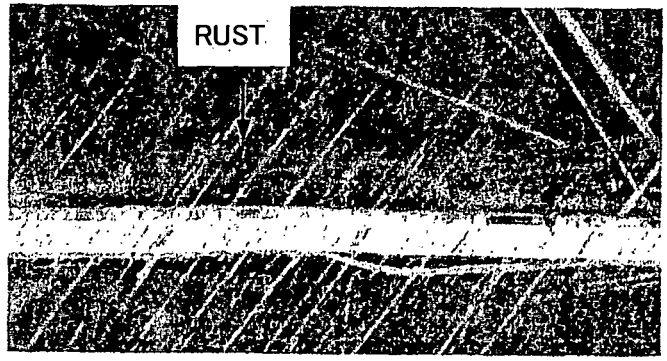
FIG. 7 is a diagram showing the result of a cross-sectional inspection of a separator test piece of a comparative example 1 in an embodiment of the present invention.
Figure 8:
FIG. 8 is a diagram showing the result of a cross-sectional inspection of a separator test piece of an example 1 in an embodiment of the present invention.

Subsequently, the separator test pieces for which 2,000 hours had elapsed from commencement of the corrosion resistance test are subjected to a cross-sectional inspection using a metallurgical microscope. FIG. 7 is a diagram showing the result of the cross-sectional inspection of the separator test piece of the comparative example 1. Furthermore, FIG. 8 is a diagram showing the result of the cross-sectional inspection of the separator test piece of the example 1. In the separator test piece of the comparative example 1, corroded portions are observed at the surface. In contrast, in the separator test piece of the example 1, no corroded portions are observed at the surface. From these results it is evident that by providing a gold strike plating layer on a titanium sheet, the corrosion resistance can be improved.

The invention claimed is:

1. A method of manufacturing a fuel cell separator that separates adjacent cells of a fuel cell, the method comprising:
    subjecting a separator substrate comprising a metal material to gold strike plating, thereby forming a first gold plating layer having a thickness of 10 nm to 200 nm, wherein the gold strike plating is conducted at a current density of 0.2 to 2 A/dm$^2$; and
    performing additional gold plating on top of the first gold plating layer formed by the gold strike plating, thereby forming a second gold plating layer having a thickness of 100 nm to 20 μm,
    wherein the gold concentration for the gold strike plating is lower than that for the additional gold plating, and
    wherein the separator substrate is molded from titanium or stainless steel and is subjected to at least one of a cleaning treatment and an acid washing treatment.

2. The method of manufacturing a fuel cell separator according to claim 1, wherein
    the first gold plating layer is formed with a thickness of not less than 70 nm and not more than 120 nm.

3. The method of manufacturing a fuel cell separator according to claim 1, wherein
    the first gold plating layer is formed with a thickness of not less than 70 nm and not more than 100 nm.

4. The method of manufacturing a fuel cell separator according to claim 1, wherein the gold strike plating is performed with a plating bath comprising gold potassium cyanide or gold sodium sulfite.

* * * * *